(12) United States Patent
Augenstein et al.

(10) Patent No.: US 9,164,950 B2
(45) Date of Patent: *Oct. 20, 2015

(54) USE TAG CLOUDS TO VISUALIZE COMPONENTS RELATED TO AN EVENT

(71) Applicant: International Business Machines Corporation, Armonk, NY (US)

(72) Inventors: Oliver Augenstein, Boeblingen (DE); Joerg Erdmenger, Boeblingen (DE); Hans-Ulrich Oldengott, Boeblingen (DE); Thomas Prause, Boeblingen (DE); Martin Raitza, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/892,239

(22) Filed: May 10, 2013

(65) Prior Publication Data

US 2013/0254406 A1    Sep. 26, 2013

Related U.S. Application Data

(63) Continuation of application No. 12/732,896, filed on Mar. 26, 2010, now Pat. No. 8,516,106, which is a continuation-in-part of application No. 12/727,325, filed on Mar. 19, 2010, now abandoned.

(30) Foreign Application Priority Data

May 18, 2009 (EP) .................................... 09160465

(51) Int. Cl.
G06F 15/173 (2006.01)
G06F 11/32 (2006.01)
G06F 11/34 (2006.01)

(52) U.S. Cl.
CPC ............ *G06F 15/173* (2013.01); *G06F 11/324* (2013.01); *G06F 11/3466* (2013.01); *G06F 11/3476* (2013.01); *G06F 2201/86* (2013.01); *G06F 2201/865* (2013.01); *G06F 2201/875* (2013.01)

(58) Field of Classification Search
USPC ........................................................ 711/160
See application file for complete search history.

(56) References Cited

U.S. PATENT DOCUMENTS

| | | | |
|---|---|---|---|
| 5,655,081 A | 8/1997 | Bonnell et al. | |
| 6,167,538 A | 12/2000 | Neufeld et al. | |
| 6,393,386 B1 | 5/2002 | Zager et al. | |

(Continued)

*Primary Examiner* — Dustin Nguyen
(74) *Attorney, Agent, or Firm* — North Shore Patents, P.C.; Michele Liu Baillie

(57) ABSTRACT

A method, system, and computer program product for displaying components assigned to events produced by resources, includes: registering a new resource by generating a label to which is associated a system specific device identifier used by the new resource within a computing environment; storing in a mapping table the generated label identifying the registered new resource together with an associated system specific device identifier; and updating the mapping table by associating to the label any other system specific device identifier used by the new resource within the computing environment; receiving events produced by resources when being executed within the computing environment, each event being associated with a list of labels for the resources relevant for the generation of the event; and maintaining a tag cloud including different tags, the different tags including labels for the resources associated with the received events to be displayed as components.

12 Claims, 5 Drawing Sheets

(56) References Cited

U.S. PATENT DOCUMENTS

| | | |
|---|---|---|
| 6,425,005 B1 | 7/2002 | Dugan et al. |
| 6,519,625 B1 | 2/2003 | Murrell et al. |
| 7,711,783 B1 | 5/2010 | Violleau et al. |
| 8,014,308 B2 | 9/2011 | Gates, III et al. |
| 8,200,700 B2 | 6/2012 | Moore et al. |
| 8,219,916 B2 | 7/2012 | Bonforte et al. |
| 2004/0078532 A1* | 4/2004 | Tremaine ............... 711/160 |
| 2009/0265631 A1 | 10/2009 | Sigurbjornsson et al. |
| 2010/0332478 A1 | 12/2010 | Duman et al. |

\* cited by examiner

USE TAG CLOUDS TO VISUALIZE COMPONENTS RELATED TO AN EVENT

CROSS-REFERENCE TO RELATED APPLICATIONS

The present application is a continuation of co-pending U.S. patent application Ser. No. 12/732,896, filed on Mar. 26, 2010, issued as U.S. Pat. No. 8,516,106 on Aug. 20, 2013, which in turn is a continuation-in-part of U.S. patent application Ser. No. 12/727,325, filed on Mar. 19, 2010, which in turn claims priority to European Patent Application No. 09160465.2, filed on May 18, 2009.

BACKGROUND

1. Field of the Invention

The present invention relates generally to an improved monitoring application and in particular to a method, system, and computer program product for a monitoring application. Still more particularly, the present invention relates to a computer implemented method, a system, and a computer program product for displaying components assigned to events produced by resources analyzed by a monitoring application, the resources being executed within some computing environment. It is also related to a monitoring application for analyzing resources being executed within some computing environment.

2. Description of the Background

A person or team facilitates the management of a large-scale, possibly far-flung computer network, such as the extensive distributed systems that are commonplace nowadays in large organizations. The person or team responsible for this job is typically in charge of everything from the organization's power supplies to its business software applications. The organization's business management, naturally, may not wish to concern itself with the technical details, but does demand that when problems occur, they be dealt with according to the seriousness of the effects they have on the normal operations of the business. For example, management will want the greatest attention to be paid to those problems that affect the highest revenue generators among the various parts of the business organization.

This is a difficult demand to meet. For many network operation managers, it can be very hard just managing the network, identifying, diagnosing and correcting problems as they occur. Being able to prioritize among a set of problems occurring during the same time period in such a way as to differentiate among levels of service being provided to different parts of the business organization has thus far been beyond contemplation.

The phenomenal complexity of the world of a large distributed network of interrelated components is reflected in the distribution of costs involved in managing such a system. If it takes on average three times as long to identify a problem as it does to solve it, the distributed systems parts (hardware and software) and their interrelationships is nearly impenetrable to the operators.

At present, operators are unable to tell how a given problem affects the various users in the business organization, and therefore are unable to know where they should direct enhanced or reduced service efforts, until the problem has been correctly identified. One result of this is that the operations managers have only the other 25% of operations time—the problem resolution portion—from which to carve out all service differentiation, 75% of operations time being spent on identifying problems.

Further, identification of the problem does not necessarily lead clearly to successful resolution of the problem. For example, suppose that the operator has correctly identified the root of a given problem as a bad card in an IP ("Internet Protocol") router. Do any critical business systems depend on that router? Perhaps, or perhaps not. Before the operator can direct problem resolution efforts to a specific part of the business organization, therefore, he or she needs to understand the systemic impact of the problem. Impact is sensitive to a wide system context, and even to conditions of the moment. The operation manager can attempt to deliver differentiated levels of service only when she knows whether and how this particular fault has affected particular groups of users under the conditions of the network at the time of the failure. As a result, management information about all of the existing components must be collected.

System management information about the components are correlated and analyzed to access the performance and availability of a particular service being provided within the organization. System management information is the information needed to monitor and manage a specific component in a network data processing system. Thereby, a description (a tag) can be assigned by an individual, usually the system manager, to the different components and/or applications. It is possible to use Web 2.0 tag clouds techniques to optimize the visualization of the tags corresponding to collection of information within some system management. The tag cloud is built out of all the assigned tags. And tag frequency is visualized by different sizes and/or color for the fonts. A drilldown can also be used to view all elements which have a specific tag. But such technique does not avoid the awkward requirement to collect management information about all of the existing components.

FIG. 1 shows a system monitoring as known from prior art. Two different applications (Application A 101 and Application B 102) make use of various resources (Res1 104, Res2 105, and Res3 106), which may or may not be shared between the applications 101-102. The applications 101-102 are instrumented and have the capability to produce "events" which will be processed by a system monitor 106. Different applications create different events and those events are associated with further information (data). Examples for events are: "operation X completed successfully", "the schedule Y could not be executed because resource 1 could not be found", "the throughput for operation Z is 2 TB/h (tera byte per hour)".

The nature of events depends heavily on the application specifics. A system monitor 106 receives those events 107-108 and converts their data into measurable quantities, such as "average response time", and "system available", and sends an alert 109. The system monitor 106 does not correlate information received from different applications since this would require a high degree of manual customization. The main reason for this problem is that events typically do not contain enough information to correlate events produced from different applications automatically. For example, an application might report a service failure without specifying that this failure was caused by a resource that is temporarily unavailable. A system monitor 106 would not know that two applications were failing due to unavailability of the same resource. Thus, there exists a need to overcome at least one of the preceding deficiencies and limitations of the related art.

BRIEF SUMMARY

The shortcomings of the prior art are overcome and additional advantages are provided through the provision of a computer implemented method for displaying components assigned to events produced by applications or resources according to the present invention. The applications are executed within a computing environment. The computer implemented method comprises: registering a new resource by generating a label to which is associated a system specific device identifier used by the new resource within the computing environment; storing in a mapping table the generated label identifying the registered new resource together with the new resource's associated system specific device identifier; updating the mapping table by associating to the generated label any other system specific device identifier used by the new resource within the computing environment; receiving events produced by the resources when being executed within the computing environment, each event being associated with a list of labels for the resources relevant for the generation of the event; and maintaining a tag cloud comprising different tags, the different tags comprising labels for the resources associated with the received events to be displayed as components. In an embodiment, the different tags are weighted according to an occurrence of a respective resource within the received events.

In an embodiment according to the present invention, the registering of a new resource includes: determining if all resources depending on the new resource are already registered with an appropriate label; and in response to determining that not all resources to which the new resource depends on is already registered: generating a new label to which is associated a system specific device identifier used by the new resource; and firing a reconciliation event with the new label and the associated system specific device identifier used by the new resource, the reconciliation event to be checked by a control instance.

In an embodiment according to the present invention, in response to determining that the reconciliation event corresponds to the new resource that is not already registered: storing the new label in the mapping table together with the associated system specific device identifier used by the new resource; and updating the mapping table by associating to the generated label any other system specific device identifier used by the new resource within the computing environment.

In an embodiment according to the present invention, in response to determining the reconciliation event corresponds to the new resource already registered with a different label, using an alias table to associate the system specific device identifier used by the new resource with different labels.

In a further embodiment according to the present invention, resource classes are predefined and associated with a specific event-to-event names table.

In an embodiment according to the present invention, when aliases for resources are required, then predefined aliases for the new resource are taken from a configuration management database. That configuration management database can be used also to find predefined resource classes.

Additional features and advantages are realized through the techniques of the present invention. Other embodiments and aspects of the invention are described in detail herein and are considered a part of the claimed invention. For a better understanding of the present invention with advantages and features, refer to the description and to the drawings.

System and computer program products corresponding to the above-summarized methods are also described and claimed herein.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other objects, features, and advantages of the present invention are apparent from the following detailed description taken in conjunction with the accompanying drawings in which:

Figure 1:
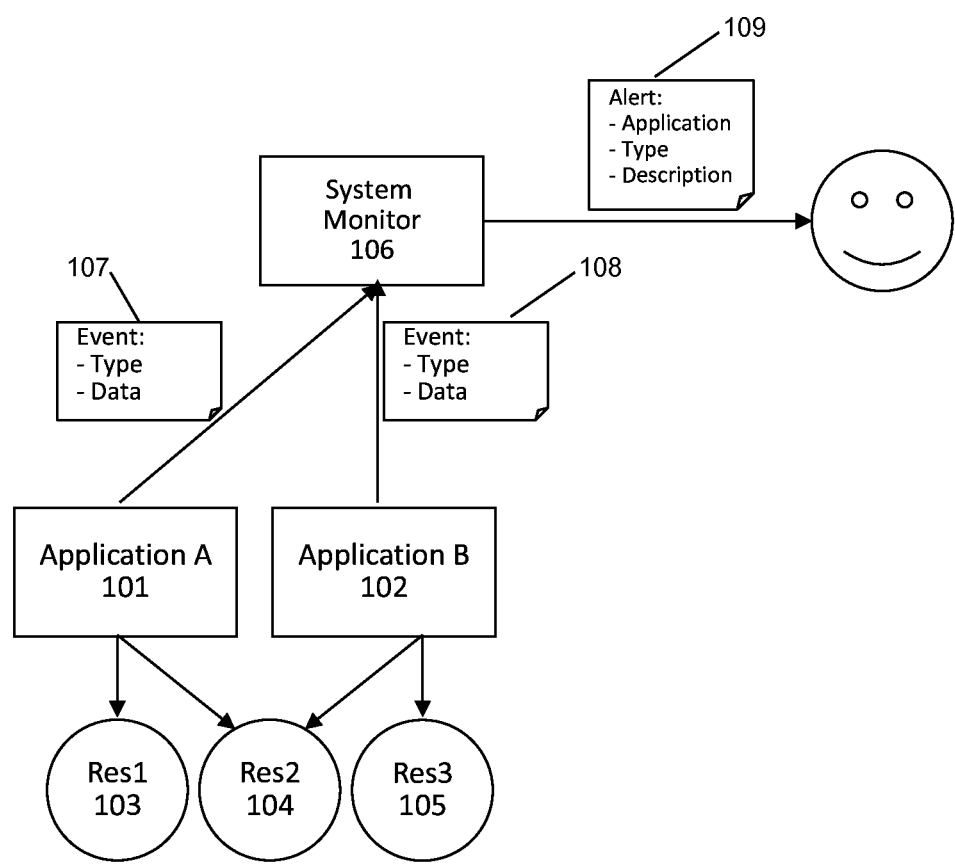
FIG. 1 illustrates a monitoring infrastructure according to the prior art.

The detailed description explains the preferred embodiments of the present invention, together with advantages and features, by way of example with reference to the drawings.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 5:
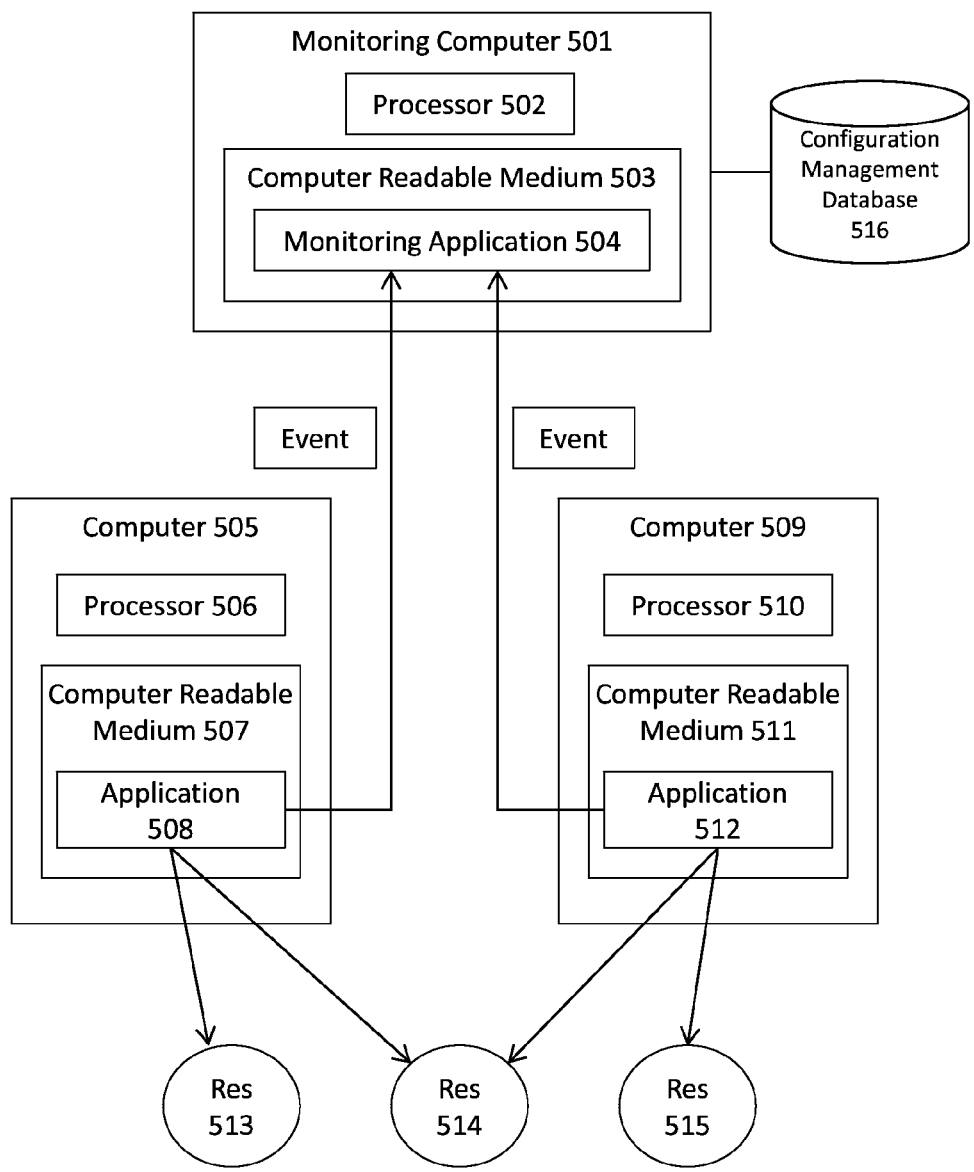
FIG. 5 illustrates an embodiment of a system, or computing environment, of the present invention.

FIG. 5 illustrates an embodiment of a system, or computing environment, of the present invention. The computing environment 500 includes a monitoring computer 501, which is operationally coupled to a processor 502 and a computer readable medium 503. The computer readable medium 503 stores computer readable program code for implementing the method of the present invention. The processor 502 executes the program code to provide a monitoring application 504 according to the various embodiments of the present invention. The computing environment 500 further includes computers 505 and 509, each operationally coupled to the monitoring computer 501. Each computer 505, 509 is operationally coupled to a processor 506, 510 and a computer readable medium 507, 511. The computer readable medium 507 stores computer readable program code, which when executed by the processor 506, implements the application 508. The computer readable medium 511 stores computer readable program code, which when executed by the processor 510, implements the application 512. Each computer 505, 509 is further operationally coupled to one or more resources 513-515.

As will be appreciated by one skilled in the art, the computing environment 500 may be embodied in any data processing system suitable for storing and/or executing program code and will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention applies the concept of tag clouds to systems management, i.e. to use "tagging" to visualize components which are related to an event (e.g. an error). If an event occurs within the computing environment 500, then according to an embodiment of the present invention, the applications 508, 512 or resources 513-515 which are involved in this operation will assign tags to this particular event. In the following, both terms application and resource are used in a similar way while strictly speaking a resource is a piece of hardware. And only an application controlling such hardware shall be able to produce or fire an event. But for simplification, we consider a resource as some hardware component together with at least some elementary application controlling it and being able to deliver or fire some event. The tags will be the other components which have been involved in this operation. Such an event could be "action performed", "problem occurred", "schedule missed", or the like. And tag clouds are then used to visualize such events by a monitoring application 504 analyzing the computing environment 500. In such a way, prominent tags indicate components which cause the event most often and can be used for further analysis e.g. to investigate problems within the analyzed computing environment 500.

According to an embodiment of the present invention, an application (508 or 512) uses tags to identify the used devices (513, 514, or 515). Each device used by an application is associated with a device specific tag (for instance the Internet Protocol IP address of a host, a label identifying a network path, a Logical Unit Number LUN id, a tape cartridge, etc.). This information is propagated to the monitoring application 504 from where the applications 508, 512 are monitored together with conventional monitoring information (performance data, success/failure, amount of data transferred, response time, etc.). Applications can also depend on other applications which themselves are associated with a tag and which themselves could associate additional tags with the calling application.

Different reports can be associated with different tag clouds at the monitoring application 504, which receives monitoring information and tags from the application. For instance, a failure report is presenting a tag cloud, to which application tags are added each time an application is failing. The failure report can then display this tag cloud, which does not show the failing applications, but shows those subsystems that were involved in most of the failing applications. If for instance a host is unavailable, each application that tries to access this host will report a failure, containing the IP address of this host as a tag. Thus, in the failure report cloud, this host is associated with many hits and displayed in large font.

The monitoring application 504 needs to provide the possibility that the observed applications (508 or 512) or hardware components (513-515) can create tags which can be evaluated by the monitoring application 504. The monitoring application 504 can show on request the tag cloud for a specific event consisting of all tags (which represent the components) which have been related to this event. The events (which can be tagged) need to be predefined, while the components (which can be used as a tag—assigned to the event) can be chosen by the application/component which assigns the tags. The tags could be the names of other applications, systems and subcomponents which have been used to perform the operation in question.

Unlike web 2.0 tags, an application can tag a certain device with some multiplicity. For instance, if a certain device is impacting the performance more significantly than another, the tag associated with this device is reported with a higher multiplicity to the monitoring application 504 than an idle resource. Also the monitoring application 504 can associate higher multiplicities with applications that are more important to the business (for example SAP could be associated with a higher multiplicity than an MP3 player).

According to an embodiment of the present invention, each application has a method to locate all other applications and resources it depends on deterministically. While applications are typically identified via an IP address and port name, resources are typically accessed from the system where the application is currently running through some kind of an operating system specific device identifier. Unfortunately the same application/resource might be accessed through multiple different channels. For instance the same disk drive might be accessed from machine 9.125.12.125 as /dev/hda1 and from machine 9.125.11.22 as /dev/hdb.

In order to enable the monitoring application 504 to uniquely identify resources as well as applications within the entire analyzed landscape (computing environment 500), globally unique labels are generated to be associated with system specific device identifiers identifying the respective applications and resources. Those labels are then maintained in a mapping table that maps local resource identifiers to its global labels. In order to translate local identifiers to global labels, the monitoring application 504 provides the following mapping services:

Label=getLabelForResource(IP address, device identifier) This method converts a system specific device identifier into a globally unique label. It is based on the assumption that all resources are accessed as devices from hardware that is associated with an IP address. Similar to resources, applications are associated with globally unique labels, which can be determined from knowing IP address and port number on which an application is listening:

Label=getLabelForApplication(IP address, port)

If a resource can also be managed through an application interface, it is also possible to associate the application and resource with the same label.

The conversion from system specific information to a globally unique label is maintained in a mapping table which maps local resource identifier to global resources. Whenever a new application/resource is added to the computing environment 500, this mapping table needs to be updated. For that purpose, two services are provided by the monitoring application 504 to update the mapping table for resources:

Label=generateLabelForResource(IP address, device identifier) setLabelForResource(IP address, device identifier, label);

Similar services are provided to update the mapping table for applications:

Label=generateLabelForApplication(IP address, port) setLabelForApplication(IP address, port, label)

Applications according to an embodiment of the present invention will automatically register themselves and all resources they rely on upon start. For that purpose they use generateLabelForApplication to generate a unique label for themselves, and setLabelForApplication to set the same label to all other ports they are listening on, and eventually setLabelForResource for all device interfaces they are adding to the computing environment 500. In addition to that, the application determines if all applications and resources used are already registered. For that purpose the application is calling getLableForResource for all resources it depends on and getLabelForApplication for all applications. If a label is not found for an application/resource the application depends on, the application generates a new label automatically and notifies the system administrator to validate the mapping table by sending a reconcile event to the monitoring application 504 (see below).

Figure 2:
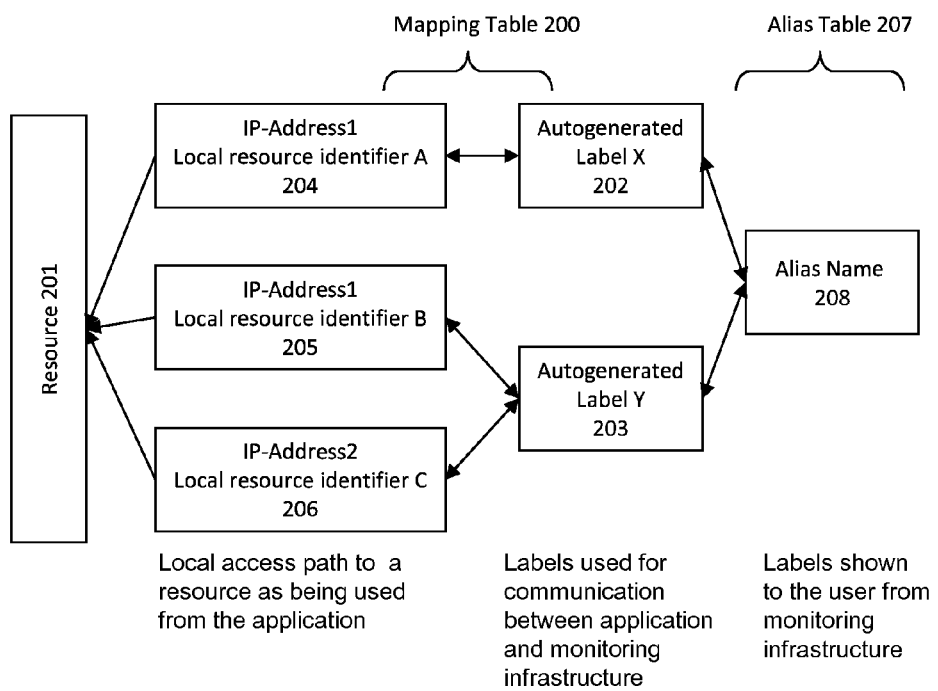
FIG. 2 illustrates one example of defining mapping table and alias table according to an embodiment of the present invention.

On FIG. 2 is shown an example of defining mapping 200 and alias 207 tables according to an embodiment of the present invention. Whenever an application detects that one of the applications/resources 201 on which it depends is not associated with a label, it automatically generates a new label 202-203 for that resource and fires a reconciliation event that contains the name of the new label as well as its local identifier 204-206. A system administrator (a control instance at the monitoring computer 501) receiving that event can now check, whether the application has indeed identified a new resource or whether this resource is already known via a different label. In the later case, the system administrator can "rename" the label so that it is associated with the appropriate resource. Instead of actually renaming the label, an alias table 207 can be used where all labels identifying the same resource are associated to the same alias name 208.

As usual, applications or resources will produce events when running. But unlike the prior art, the events come with a list of labels for resources/applications that were relevant for the generation of this event. If for example a service failed because one of the resources was unavailable, the monitoring application 504 does yet know the label of the resource which was actually causing this failure until the event is reported with the list of labels.

A user can assign "event-names" to all events that are created from a specific application. This relation is maintained in an event-to-event-names table. In order to simplify the task for creating this table for a newly registered application, the application itself can be associated with an "application-class", so that only one event-to-event-names table needs to be maintained per application class. In order to further simplify the process, applications can be associated with a built-in application-class, which is used as default and is provided to the monitoring application 504 during registration.

Figure 3:
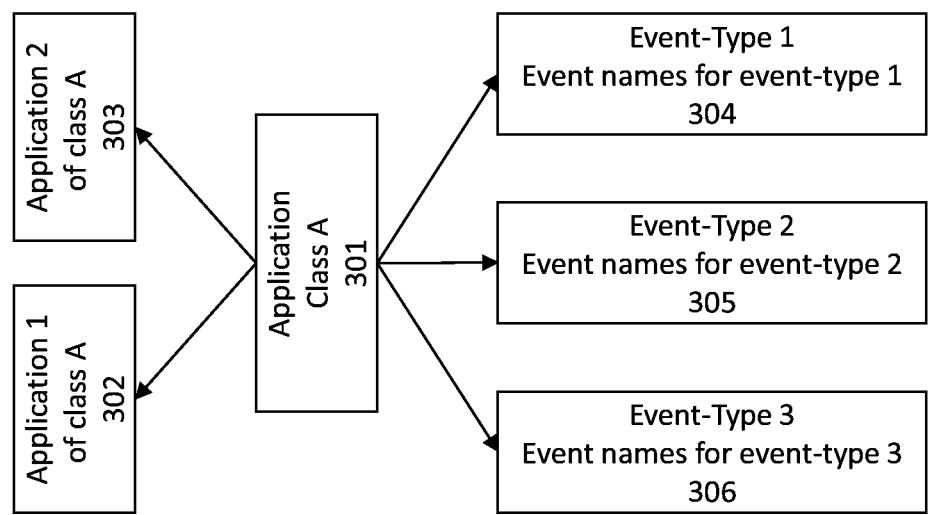
FIG. 3 illustrates one example of a diagram showing different events according to an embodiment of the present invention.

On FIG. 3 is shown a diagram with different events according to an embodiment of the present invention. The registration is a one-time operation that is initiated from the application. It can consist of the following services provided from the monitoring computer 501:

setDefaultApplicationClass (Label, applicationClassName) addApplicationEvent (Label, event-type, defaultEventName)

The first call tells the monitoring application 504 the name of the application-class 301 that shall be associated to the application/resource 302-303 identified with Label. This relationship is maintained in the application-class table (not shown) and is updated if and only if the current label is not already listed in this table. The second call is used to register all events that might be generated from the application identified with label. For each application-class listed in the application-class table, there is exactly one event-to-event-names table. This table contains one entry (304-306) for each event-type registered with addApplicationEvent mapping a specific event type to the associated event-names. This entry is first initialized to the defaultEventName.

Figure 4:
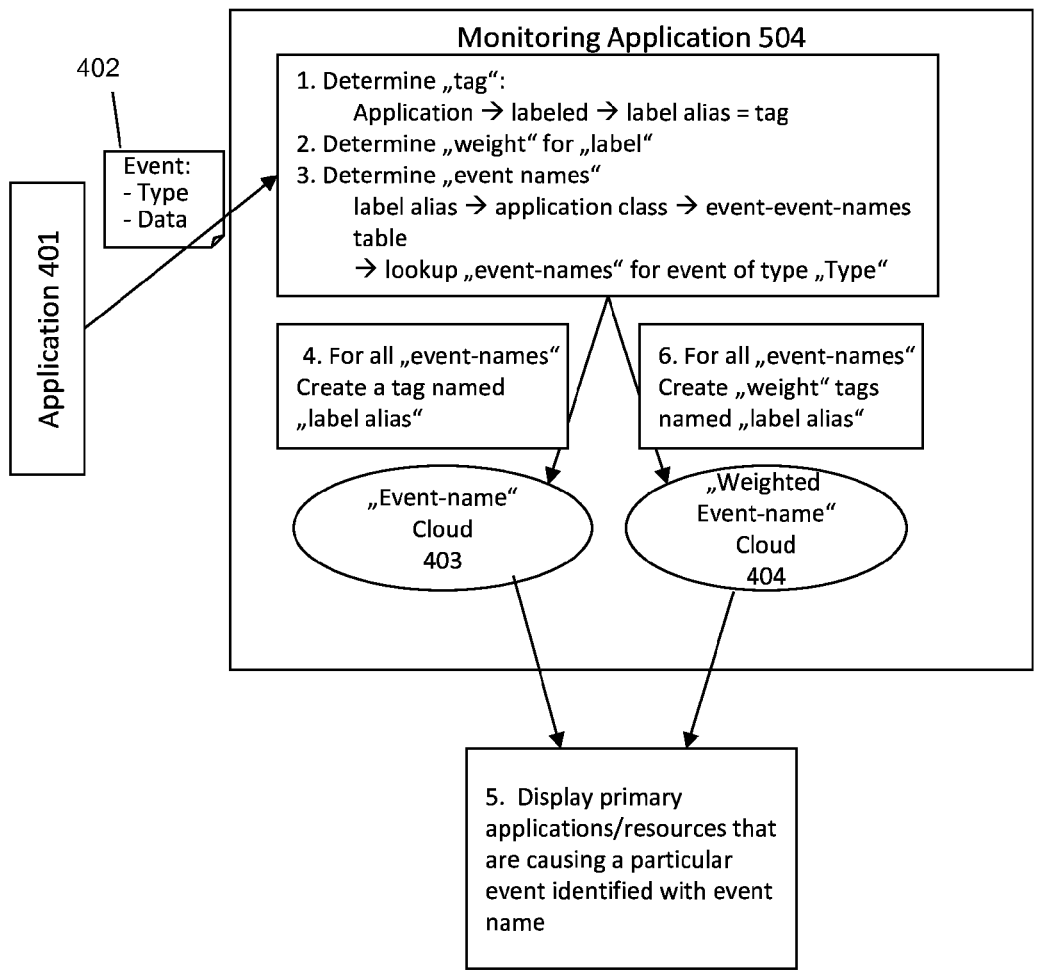
FIG. 4 illustrates one example of a monitor according to an embodiment of the present invention.

FIG. 4 shows an example of a monitor processing according to an embodiment of the present invention. During operations, some application or resource 401 is producing events. Those events are delivered to the monitoring application 504 to be processed. The monitoring application 504 determines the label, or tag, for the vent (step 1), determines a "weight" for the tag (step 2), and uses the event-to-event-names table to determine the "event-names" that are associated with this event (step 3). For each event-name found, the monitoring application 504 maintains a tag-cloud 403 that is tagged with each "label" that was listed in the event that is currently being processed (step 4). The tag cloud would then be displayed, showing the primary applications/resources that were causing a particular event as identified with the event name (step 5).

Other tag clouds could be displayed with slightly different aspects. In addition to simply tagging all event-names with the labels listed in the event, it is also possible to create tags with a multiplier that takes into account the relevance of a particular application (step 6), thus producing a "weighted tag cloud". An application label (not necessarily the application class) can be associated with a weight. Each event produced from an application with "weight 2" would then tag the associated event twice instead of once.

In the case where there exists some software component that maintains already some relationship between applications and underlying computing resources, such information can be advantageously used to define the required aliases for the resources. This is typically the case when a configuration management database 516 (FIG. 5) is already in use within the computing environment 500. An example of such configuration management database is the Tivoli Change and Configuration Management Database™ (CCMDB). It is capable of locating the physical hardware (LPAR, Storage) that is used for a specific SAP system. In order to accomplish its tasks, the CCMDB also provides methods that associate unique names to applications and resources. And according to an embodiment of the present invention, those unique identifiers can be re-used as tags. For this, the monitoring application 504 needs to be modified such that each time an application or resource is creating an event, the monitoring application 504 is tagging the appropriate Service Level Agreements (SLAs) with all CCMDB ids i.e. tags that are associated with the application.

In the following, we assume that the computing environment 500 comprises several hardware resources on which a huge number of applications are running, such as in a typical datacenter. In addition, we assume that the following infrastructure components are present: a CCMDB infrastructure and a monitoring application 504. The CCMDB is essentially a database that can be used to track dependencies between applications and hardware resources that can be used for mining purposes. The CCMDB infrastructure comes with a monitoring application 504 that screens the computing environment 500 in order to determine those dependencies. And the monitoring application 504 receives various events from applications within the datacenter that are of relevance for monitoring and reporting.

Furthermore, a tag management console (not shown) within the monitoring computer 501 can be used to query the CCMDB for all unique CCMDB ids and to determine a collection of tags for every application that is running within the computing environment 500. It is also used to query the monitoring application 504 for the collection of events that can be produced from an application. Finally, the tag management console provides a user interface that allows a system administrator to select for each application or resource and its associated collection of events, those tags from the collection of tags of the application that are meaningful in the context of the particular event. By default, all tags in the collection of tags are associated with every event. The monitoring application 504 analyzing such computing environment 500 is accordingly modified such that when the monitoring application 504 receives an event from an application, the monitoring application 504 queries the tag management console for all tags that are associated with this event type and application, and uses those tags to tag the SLAs that are associated with the currently processed event.

What is claimed is:

1. A computer implemented method for displaying components assigned to events produced by resources, the resources being executed within a computing environment, the method comprising:
registering a new resource by generating a label for the new resource to which is associated a system specific device identifier used by the new resource within the computing environment, comprising:
determining if all resources on which the new resource depends are already registered with an appropriate label; and
in response to determining that not all resources on which the new resource depends on is already registered, generating the label to which is associated a system specific device identifier used by the new resource;
storing in a mapping table the generated label together with the new resource's associated system specific device identifier; and
updating the mapping table by associating to the generated label any other system specific device identifier used by the new resource within the computing environment.

2. The method of claim 1, wherein the registering the new resource by generating the label to which is associated the system specific device identifier used by the new resource within the computing environment comprises:
firing a reconciliation event with the new label and the associated system specific device identifier used by the new resource to a monitoring application.

3. The method of claim 1, further comprising:
receiving events produced by resources when being executed within the computing environment, each event being associated with a list of labels for the resources relevant for the generation of that event; and
maintaining a tag cloud comprising different tags, the different tags comprising labels for the resources associated with the received events to be displayed as components.

4. The method of claim 3, further comprising:
displaying the tag cloud for a specific event, wherein the displayed tag cloud comprises the tags for the specific event, the tags for the specific event comprising the labels for the resources within the distributed computing environment associated with the specific event.

5. A computer program product for displaying components assigned to events produced by resources, the computer program product comprising:
a non-transitory computer readable medium having computer readable program code embodied therewith, the computer readable program code comprising:
computer readable program code configured to:
register a new resource by generating a label for the new resource to which is associated a system specific device identifier used by the new resource within the computing environment, comprising:
determine if all resources on which the new resource depends are already registered with an appropriate label; and
in response to determining that not all resources on which the new resource depends on is already registered, generate the label to which is associated a system specific device identifier used by the new resource;
store in a mapping table the generated label together with the new resource's associated system specific device identifier; and
update the mapping table by associating to the generated label any other system specific device identifier used by the new resource within the computing environment.

6. The computer program product of claim 5, wherein the computer readable program code configured to register the new resource by generating the label to which is associated the system specific device identifier used by the new resource within the computing environment is further configured to:
fire a reconciliation event with the new label and the associated system specific device identifier used by the new resource to a monitoring application.

7. The computer program product of claim 5, wherein the computer readable program code is further configured to:
receive events produced by resources when being executed within the computing environment, each event being associated with a list of labels for the resources relevant for the generation of that event; and
maintain a tag cloud comprising different tags, the different tags comprising labels for the resources associated with the received events to be displayed as components.

8. The computer program product of claim 7, wherein the computer readable program code is further configured to:
display the tag cloud for a specific event, wherein the displayed tag cloud comprises the tags for the specific event, the tags for the specific event comprising the labels for the resources within the distributed computing environment associated with the specific event.

9. A system, comprising:
a plurality of resources comprising a new resource; and
a monitoring computer for:
registering a new resource by generating a label for the new resource to which is associated a system specific device identifier used by the new resource within the computing environment, comprising:
determining if all resources on which the new resource depends are already registered with an appropriate label; and
in response to determining that not all resources on which the new resource depends on is already registered, generating the label to which is associated a system specific device identifier used by the new resource;
storing in a mapping table the generated label together with the new resource's associated system specific device identifier; and
updating the mapping table by associating to the generated label any other system specific device identifier used by the new resource within the computing environment.

10. The system of claim 9, wherein the registering the new resource by generating the label to which is associated the system specific device identifier used by the new resource within the computing environment comprises:
firing a reconciliation event with the new label and the associated system specific device identifier used by the new resource to a monitoring application.

11. The system of claim 9, the monitoring computer further for:
- receiving events produced by resources when being executed within the computing environment, each event being associated with a list of labels for the resources relevant for the generation of that event; and
- maintaining a tag cloud comprising different tags, the different tags comprising labels for the resources associated with the received events to be displayed as components.

12. The system of claim 11, the monitoring computer further for:
- displaying the tag cloud for a specific event, wherein the displayed tag cloud comprises the tags for the specific event, the tags for the specific event comprising the labels for the resources within the distributed computing environment associated with the specific event.

* * * * *